United States Patent
Tomaino

(10) Patent No.: US 10,457,569 B2
(45) Date of Patent: Oct. 29, 2019

(54) APPARATUS, SYSTEM, AND METHODS FOR USING HUMAN ENERGY IN COLLECTING, TRANSPORTING, AND PURIFYING WATER

(71) Applicant: Shane E Tomaino, Rye, NY (US)

(72) Inventor: Shane E Tomaino, Rye, NY (US)

(*) Notice: Subject to any disclaimer, the term of this patent is extended or adjusted under 35 U.S.C. 154(b) by 186 days.

(21) Appl. No.: 15/686,411

(22) Filed: Aug. 25, 2017

(65) Prior Publication Data

US 2019/0062179 A1    Feb. 28, 2019

(51) Int. Cl.
*C02F 1/28*    (2006.01)
*C02F 1/32*    (2006.01)
(Continued)

(52) U.S. Cl.
CPC .............. *C02F 1/283* (2013.01); *B01D 15/00* (2013.01); *B01J 20/20* (2013.01);
(Continued)

(58) Field of Classification Search
CPC .......... C02F 1/002; C02F 1/283; C02F 1/325; C02F 2201/006; C02F 2201/008;
(Continued)

(56) References Cited

U.S. PATENT DOCUMENTS 7,119,451 B2    10/2006    Baarman et al.
7,754,090 B1    7/2010     Berg
(Continued)

FOREIGN PATENT DOCUMENTS

EP    2415717 A1       2/2012
KR    20150097176 A    8/2015
(Continued)

OTHER PUBLICATIONS

"Intel International Science and Engineering Fair 2017 Grand Award Winners." Society for Science & the Public, May 9, 2017. Online. Internet. Accessed Sep. 26, 2017. https://www.societyforscience.org/content/press-room/intel-international-science-and-engineering-fair-2017-grand-award-winners.
(Continued)

*Primary Examiner* — Matthew O Savage
(74) *Attorney, Agent, or Firm* — John C. Stellabotte; Ellenoff Grossman & Schole LLP

(57) ABSTRACT

Apparatuses, systems, and methods for collecting, transporting, and purifying water using human energy from transport. A barrel shaped water impermeable container made of material comprising an ultraviolet (UV) light stabilized polymer that can be pushed or rolled. The container has one or more ports with removable filters to remove pre-sediment prior to transport and post-sediment after transport. A translucent water impermeable casing comprising an electrical box having at least two removable and replaceable UV lights, connected to copper coils with rotating magnets inside the coil generate power to light the ultraviolet lights and purify water in the container. Three or more removable proportionally spaced carbon fin cartridges rotate about a container closed end axis when the container is pushed or pulled to provide additional purification. Carbon fin cartridges can have a polylactic acid shell wrapped in liquid permeable mesh shell and evenly spaced holes packed with carbon.

25 Claims, 6 Drawing Sheets

(51) Int. Cl.
    *B01D 15/00*     (2006.01)
    *B01J 20/20*     (2006.01)
    *B01J 20/28*     (2006.01)
    *H01J 7/00*     (2006.01)
    *C02F 1/00*     (2006.01)
    *C02F 1/48*     (2006.01)

(52) U.S. Cl.
    CPC ......... *B01J 20/28016* (2013.01); *C02F 1/325* (2013.01); *H01J 7/00* (2013.01); *C02F 1/002* (2013.01); *C02F 1/481* (2013.01); *C02F 2201/006* (2013.01); *C02F 2201/008* (2013.01); *C02F 2201/009* (2013.01); *C02F 2201/3227* (2013.01); *C02F 2303/04* (2013.01)

(58) Field of Classification Search
    CPC ........ C02F 2201/009; C02F 2201/3227; C02F 2303/04; C02F 1/481; B01J 20/20; B01J 20/28016; B65D 25/02; B65D 25/2867; B65D 85/72; B01D 15/00; H01J 7/00
    See application file for complete search history.

(56) References Cited

U.S. PATENT DOCUMENTS

| | | | |
|---|---|---|---|
| 8,674,322 B2 | 3/2014 | Kohler | |
| 2004/0134847 A1 | 7/2004 | Lin | |
| 2005/0109690 A1 | 5/2005 | Bechtold | |
| 2005/0258108 A1 | 11/2005 | Sanford | |
| 2006/0231476 A1* | 10/2006 | Vandenbelt | C02F 1/003 |
| | | | 210/266 |
| 2011/0038754 A1* | 2/2011 | James | C02F 1/325 |
| | | | 422/24 |
| 2011/0084497 A1 | 4/2011 | Barbar | |
| 2011/0104017 A1 | 5/2011 | Migliore et al. | |
| 2013/0075312 A1 | 3/2013 | Ervin | |
| 2014/0175024 A1 | 6/2014 | Schoepf et al. | |
| 2015/0231540 A1* | 8/2015 | Koenig | B01D 35/02 |
| | | | 210/241 |

FOREIGN PATENT DOCUMENTS

| | | |
|---|---|---|
| TW | 201318977 | 5/2013 |
| WO | 2008099158 A2 | 8/2008 |

OTHER PUBLICATIONS

"Shane Tomaino '18 Takes First Place." Rye Country Day School, May 19, 2017. Online. Internet. Accessed Sep. 26, 2017. https://www.ryecountryday.org/about/news-media-from-wildcat-world/news-item/~post/shane-tomaino-18-takes-first-place-20170519.

"Students Impress at Area Science Fairs." Rye Country Day School, May 18, 2016. Online. Internet. Accessed Sep. 26, 2017. https://www.ryecountryday.org/cf_news/view.cfm?newsid=1351.

Karayalcin, Saltuk. "Water Purification Device". Online. Internet. Accessed Sep. 26, 2017. http://idesignawards.com/winners/zoom2.php?eid=9-3964-10&cat=Rural.

International Search Report, PCT/US/2018/045398, dated Nov. 22, 2018.

Written Opinion of the International Searching Authority, PCT/US/2018/045398, dated Nov. 22, 2018.

\* cited by examiner

APPARATUS, SYSTEM, AND METHODS FOR USING HUMAN ENERGY IN COLLECTING, TRANSPORTING, AND PURIFYING WATER

FIELD OF THE INVENTION

The present invention relates to water purification methods, systems, and apparatuses, and more specifically to methods, systems, and apparatuses for collecting, transporting, and purifying water that uses human energy from transporting water to purify water.

BACKGROUND

Millions of men, women, and children suffer fatal diseases and disorders every year as a result of contaminated drinking water. In addition to the negative health effects of contaminated water, African people, mainly women and children, experience life altering disabilities and abhorrent time commitments as a result of subpar water transportation conditions and lack of proximity to a water source. In developing countries, women and children participate in strenuous, traditional methods of water carrying on a daily basis. Arduous methods of transporting water that have been used include carrying water in 20 liter buckets balanced on the head of the carrier.

There have been technologies and methods that have a made efforts to address both water purification and transportation problems. For example, LifeStraw® is a portable water purification unit in the form of a tubular housing with a length of less than 50 cm and a width of less than 80 mm, the tubular housing having a first opening at a first end for entrance of water into the tubular housing and a mouthpiece at an opposite end for suctioning water through the tubular housing. LifeStraw® uses a 0.2 micron filter to remove microorganisms within the housing. Membranes within the filter trap pathogens and allow pure water to flow through freely. LifeStraw® is able to remove 99.99% of bacteria, including debris; however, it only has the capacity to filter 264 gallons (approximately 1 year of water). And the micron filtration system of LifeStraw® is unable to remove chemicals that are found in underlying bedrock.

Unlike the filters used in the Lifestraw®, activated carbon is another method of removing chemical pollutants. Activated carbon is used to purify liquids and gases in a variety of applications, including municipal drinking water, food and beverage processing. It is also used for odor removal, industrial pollution control, and in point-of-use filters in the home. Activated carbon purifies water through physical absorption. The large internal surface area of carbon has several attractive forces that work to attract other molecules. These forces manifest in a similar manner as gravitational force. Contaminants in water are adsorbed (or adhered) to the surface of carbon from a solution as a result of differences in adsorbate concentration in the solution and in the carbon pores. But Lifestraw® is not useful for transporting water.

In contrast to water purification, there are more limited solutions for water transportation. The Hippo Roller®, which is essentially a rolling vessel, is a widely accepted one. The Hippo Roller® is a plastic barrel that is crafted from polyethylene. It is a barrel-shaped container, with a large screw-cap and clip-on steel handle, designed to transport 90 liters of water with ease.

The 90 liters that the Hippo Roller® is able to transport is 5 times more than the typical bucket load. The design allows for the vessel to be submerged for water collection, sealed, and rolled to the point of consumption. In addition, the barrel has an average lifespan of 5-7 years. The model is designed to alleviate the burden and negative health effects of manually lifting water. Hippo Roller®, and other rolling vessel models, provide alternative, less strenuous methods for transporting water. But the Hippo Roller® does not purify water.

There have been some efforts made to combine water transport and cleansing or purification functions in one apparatus. For example, U.S. Pat. No. 9,416,025 describes a water treatment and conveyance apparatus that combines both functions, but it has its drawbacks in that it describes adding a cleansing chemical, such as a chlorine tablet to sterilize the water while in transit and it also does not make any use of the kinetic energy generated during transport.

There are combined transport and purification systems that do use kinetic energy from transport and do not rely upon adding cleansing chemicals. For example, EP 2415717 describes a combined transport and cleaning apparatus that does make use of kinetic energy in including combining filtration and treatment with ultraviolet light for cleaning and does not use cleansing chemicals, but it too has its drawbacks in that it describes a design using two compartments, a raw water compartment and a clean water compartment, and does not make optimum use of the kinetic energy from transport. But there is still a need for improved apparatuses, methods, and systems that can combine transportation and purification, without chemicals, that make improved use of the kinetic energy from transport.

SUMMARY OF THE INVENTION

In one aspect, an apparatus for storing, transporting and cleaning water is provided comprising a rounded barrel shaped, water impermeable container made of material comprising an ultraviolet light stabilized polymer, the container comprising an interior container surface and exterior container surface, two opposing container closed ends, the container closed ends each having an internal surface and external surface, at least one of which has removable waterproof cap, at least one container port and corresponding removable container port cap, a handle connected to two removable arms rotatably attached to the container at a container axis of rotation to at least one of the two opposing container closed ends; the container further comprising a removable translucent, water impermeable casing attached to the inner surface of the container closed ends at the container axis of rotation that can be opened, the casing comprising an electrical box that can be opened and at least two removable and replaceable tube shaped ultraviolet lights and at least two fixed copper coils inside the casing, a free falling magnet that oscillates inside each of the at least two fixed copper coils when the container is rotated, the ultraviolet lights and the at least two copper coils connected to at least one electrical harness inside the casing, the container further comprising at least three activated carbon fin cartridges releasably fixed to a corresponding fin base and track, the fin base and track fixed to the inner surface of the fixed container closed end container, the fins spaced proportionally around a circumference of the inner surface of the container.

In one embodiment, the exterior container surface further comprises a tractive surface material. In another embodiment, the at least one container port is recessed in the container comprises a removable container port sediment filter and the container port is configured to create a water tight seal in the container when the removable container port cap is removably fixed to the container port substantially flush to the container surface to permit the container to roll.

In another embodiment, the at least one removable container port sediment port filter is configured to be rotatable about a filter port axis to pour water in or out from the container.

In another embodiment, the at least one container port comprises an entry container port and an exit container port, the entry container port for pouring untreated water into the container comprising a removable entry port pre-sediment filter of 0.5 micron or less and the exit container port for pouring purified water from the container comprising a pre-sediment filter of 0.3 micron or less for removing finer particles or silt and a flip to open dispensary nozzle.

In another embodiment, wherein the ultraviolet lights, the copper coils, and the electrical harness are configured to generate power to light the ultraviolet lights when the container is rotated about the container axis of rotation. In another embodiment, the at least two ultraviolet lights are at least 40 watts each.

In another embodiment, there are four activated carbon fin cartridges releasably fixed to corresponding fixed fin bases and tracks.

In another embodiment, one of the container closed ends contain gateways comprising caps or closures corresponding to the fin bases and tracks to permit removal of the carbon activated fin cartridges from the corresponding fin base and tracks, wherein the corresponding fin bases and tracks use spring loaded mechanisms to releasably fix the fin cartridges.

In another embodiment, one of the container closed ends contain gateways comprising caps or closures corresponding to the fin bases and tracks to permit removal of the carbon activated fin cartridges from the corresponding fin base and tracks, wherein the corresponding fin bases and tracks use friction fit mechanisms to releasably fix the fin cartridges.

In another embodiment, the at least three activated carbon fin cartridges further comprise a polylactic acid shell wrapped in liquid permeable mesh of 0.5 micron or finer that forms a cartridge, and one of the container closed ends further comprises gateways with removable caps corresponding to the fin bases and tracks.

In another embodiment, the fin cartridges further comprise evenly spaced circular holes covered by the liquid permeable mesh.

In another embodiment, the height of the cartridges is less than 2 inches fewer than a radius of the container and a depth of the cartridges is greater than 0.5 inches but does not exceed 3 inches and a length of the cartridge is approximately equal to a length of the container.

In another embodiment, the evenly spaced circular holes are 1 inch or less in diameter and spaced at least 2 inches apart.

In another embodiment, the container is made of low-density polyethylene UV stabilized by hindered amine light stabilizers.

In another embodiment, wherein the handle is made from electroplated steel and further comprises and contains coating with heat capacity to prevent burning when held.

In another aspect, a method of transporting and purifying water is provided comprising providing a rounded barrel shaped, water impermeable container made of material comprising an ultraviolet light stabilized polymer, the container comprising an interior container surface and exterior container surface, wherein the exterior container surface comprises a tractive material, two opposing container closed ends, the container closed ends each having an internal surface and external surface, wherein the external surface, at least one container port and corresponding container port cap, a handle and two removable arms rotatably attached to the container at a container axis of rotation to at least one of the two opposing container closed ends, the container further comprising a translucent, accessible, removable water impermeable casing attached to the inner surface of the container closed ends at the container axis of rotation, the casing comprising at least two removable tube shaped ultraviolet lights and at least two fixed copper coils inside the casing, a free falling magnet inside each of the at least two fixed copper coils, the ultraviolet lights and the at least two copper coils connected to at least one electrical harness inside the casing, the container further comprising at least three activated carbon fin cartridges releasably fixed to a corresponding fin base and track, the fin base and track fixed to the inner surface of at least one of the container closed ends, the fin cartridges spaced proportionally around a circumference of the inner surface of the container; inserting into the at least one container port a removable pre-sediment filter of 0.5 micron or less for to remove particles or silt from the water; pouring water to be transported and purified into the container through the pre-sediment filter; sealing the at least one container port with the removable container port cap so that the container can roll about the container axis of rotation; transporting the container filled with water by pushing or pulling the container by the handle to roll the container; the free falling magnets oscillating inside the at least two copper coils to induce voltage sufficient to light the ultraviolet lights on the water in the container to purify the water; and propelling the water in the container through the at least three carbon fins to purify the water.

In another embodiment, the method of transporting and purifying water of claim 16, further comprises inserting into one of the at least one container ports a removable pre-sediment filter of 0.3 micron or less; and removing purified water from the container through the removable pre-sediment filter of 0.3 micron or less to remove any remaining dirt or slit from the purified water.

In another embodiment, the method of transporting and purifying water comprises using four removable activated carbon fin cartridges.

In another embodiment, the removable activated carbon fin cartridges further comprise a polylactic shell wrapped in liquid permeable mesh of 0.5 micron or finer that forms a cartridge.

In another embodiment, the transporting step is performed for one to four hours.

In another embodiment, wherein the cartridges further comprise evenly spaced circular holes covered by the liquid permeable mesh.

In another embodiment, wherein a height of the cartridges is greater than 0.5 inch but does not exceed 3 inches and a length of the cartridge is approximately equal to a length of the container.

In another embodiment, the method of transporting and purifying water uses a container made of low-density polyethylene UVB stabilized by hindered amine light stabilizers.

In another embodiment, the at least one container port comprises an entry container port and an exit container port, the entry container port for pouring untreated water into the container comprising a removable entry port pre-sediment filter of 0.5 micron or less and the exit port for pouring purified water from the container comprising a post-sediment filter of 0.3 micron or less for removing finer particles or slit silt and a flip to open dispensary nozzle.

BRIEF DESCRIPTION OF THE DRAWINGS

FIG. 6A depicts a right side view of the carbon fin cartridge of FIG. 6B being inserted on a track mechanism to releasably secure the fin cartridge.

FIG. 6B shows a detailed view of the structure of a carbon fin cartridge.

DETAILED DESCRIPTION

Figure 1:
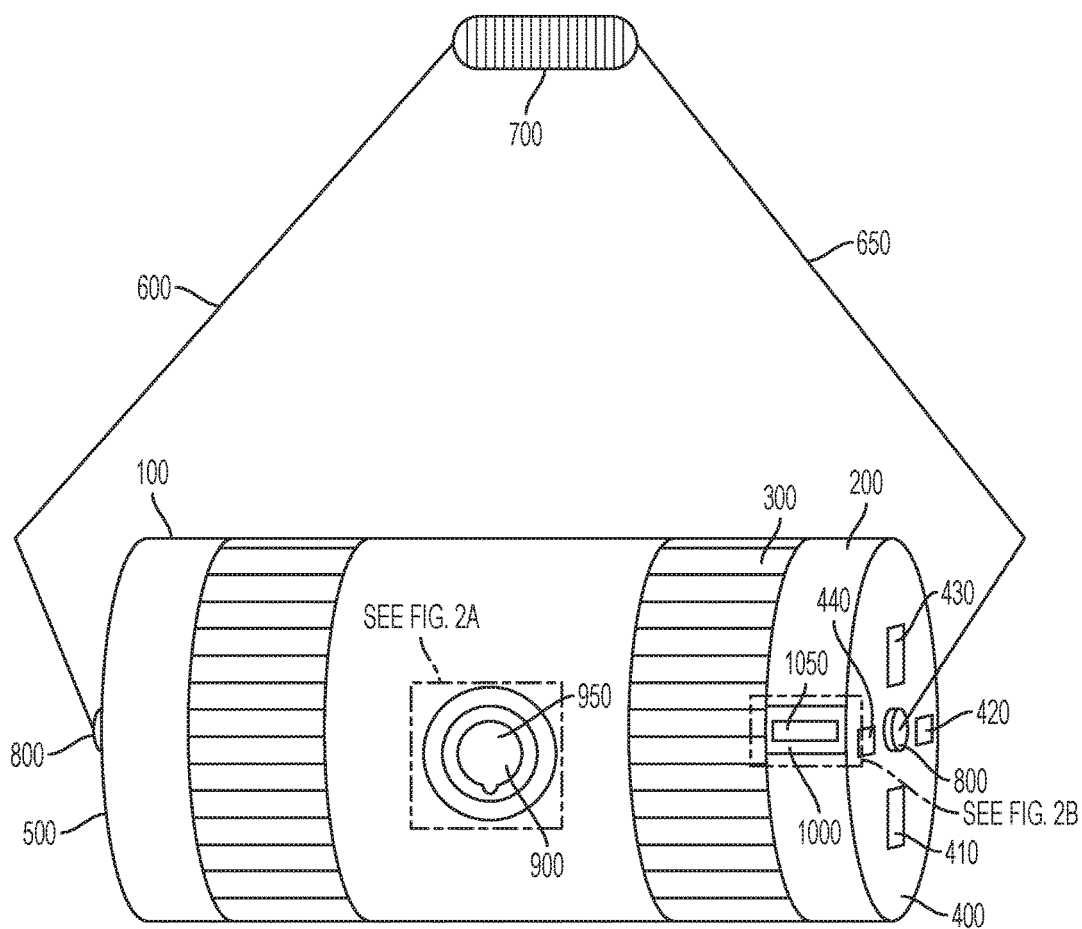
FIG. 1 depicts a front view of an apparatus for collecting, transporting, and purifying water that uses human energy from transporting water to purify water according to one aspect of the invention.

FIG. 1 depicts a hollow, barrel-shaped container 100 made of water impermeable material, comprising an ultraviolet (UV) stabilized polymer, preferably a low-density polyethylene that is UV stabilized by hindered amine light stabilizers. The container 100 is round so that it can be rolled to transport water and can be constructed to hold large amounts of water including 90 or more liters. The container 100 has an interior container surface (not depicted in FIG. 1), and an exterior container surface 200 comprising tractive material 300, to enable the container 100 to be rolled more easily over rougher terrain.

Figure 3:
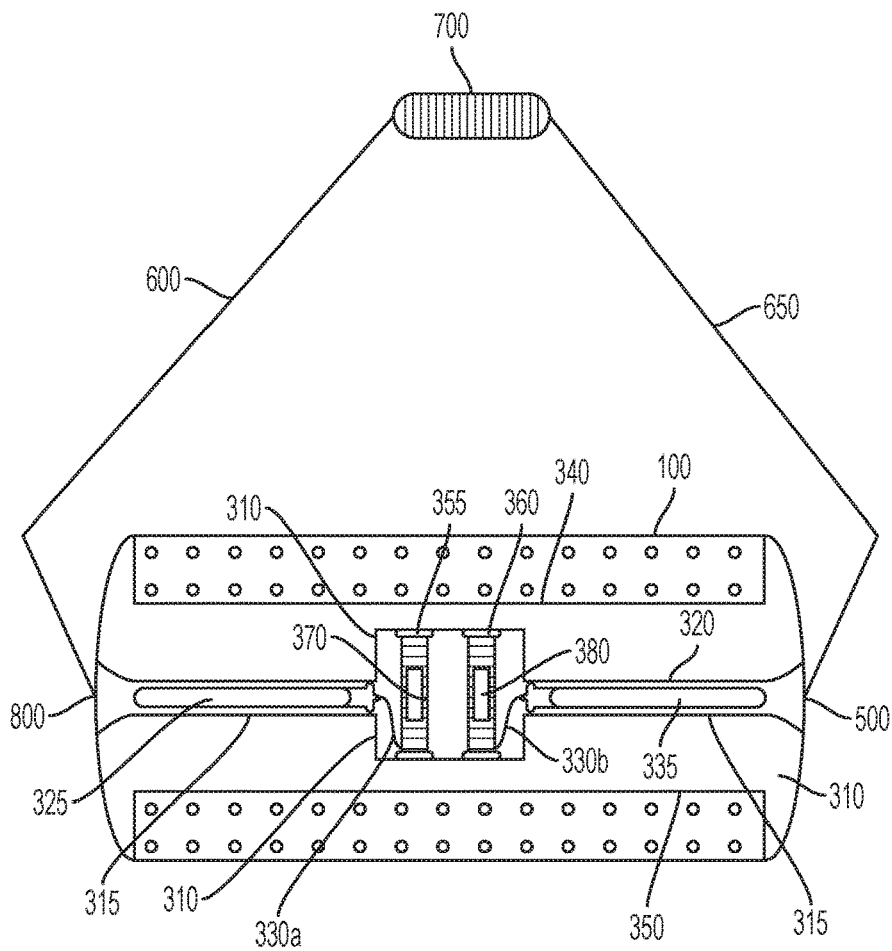
FIG. 3 depicts hollowed, view of an apparatus for collecting, transporting, and purifying water that uses human energy from transporting water to purify water according to one aspect of the invention that shows the internal structure of the container.

The container 100 also has a handle 700 connected to removable opposing arms 600 and 650 connected to the container 100 at the opposing container closed ends at the container axis of rotation at cap 800 that when closed provides a watertight seal, but can be opened to permit access to the lighting system depicted in FIG. 3. When the handle 700 is pushed or pulled, the container 700 will rotate about the container axis of rotation 800 and roll. The handle 700 and opposing arms 600 and 650 are removable to permit access to the interior surface of the barrel 100 and structures contained with the container 100 at cap 800 at the container axis of rotation. The handle 700 may be fabricated by any material with high specific heat capacity to avoid burns when exposed to sun and the opposing arms 600 and 650 can be made from any suitable material but are preferably made from is electroplated steel.

Figure 4:
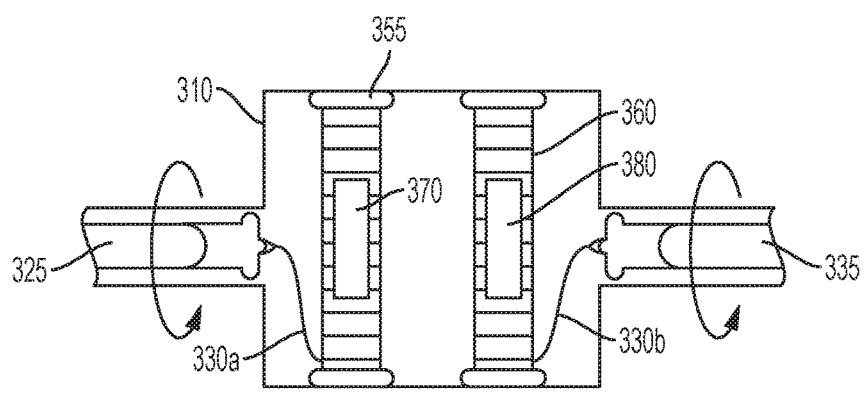
FIG. 4 depicts a detailed view of an ultraviolet (UV) lighting system used with an apparatus for collecting, transporting, and purifying water that uses human energy from transporting water to purify water according to one aspect of the invention

The container 100 also has opposing removable container closed ends 400 and 500, each having an internal and external surface with a waterproof seal. The container closed end 400 has openings with replaceable caps or closures depicted in FIG. 1 (410, 420 430, 440) that are waterproof when closed and permit access to the interior surface of container 100 and structure on the inside of the container 100 when removed so removable carbon fin cartridges can be repaired or replaced. The container closed end 400 can also be unsealed to access the system that uses human energy from transporting water to purify water (FIG. 3) and the ultraviolet (UV) lighting system (FIG. 4).

Alternatively, or in addition to closed end 400, the container 700 could be designed to be opened with a releasable waterproof seal across the length of the container 100 to enable easier interior access to the container 700 to permit removal and replacement of fins, fin cartridges, and ultraviolet lighting used inside the container for water purification purposes.

FIG. 1 depicts an entry container port 900 for adding uncleaned water to the container 100 and exit container port 1000 for removing cleaned water from the container 100. The entry container port 900 and exit container port 1000 are both recessed in the exterior container surface 200 so as to not impede the ability of the container to be rolled. The entry container port 900 and exit container port 1000 both have removable tops 950 and 1050 that create a water tight seal so that water does not leak from the container when it is rolled. The removable tops are preferably screw on tops, although other structures could be used, so long as they do not impede rolling.

Although FIG. 1 depicts both an entry container port 900 and exit container port 1000, one port can be used for both entry of unclean water into the container 100 and exit of clean water from the container 100 after purification. The entry container port 900 and exit container port 1000 can both use sediment filters shown as 920 and 980 in FIG. 2A and 1030 in FIG. 2B to screen out silt, dirt, and other particles that may be in the water before and after the water is transported and purified.

Figure 2A:
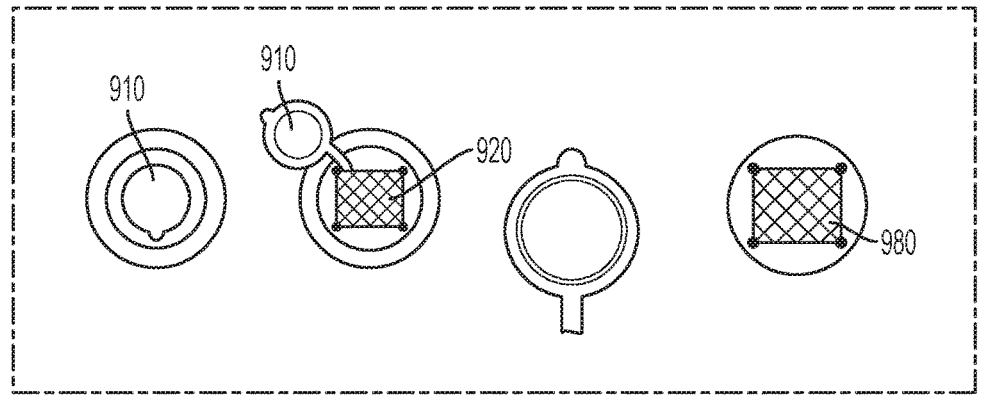
FIGS. 2A and 2B depicts detailed views of a container entry port and container exit port for use with an apparatus for collecting, transporting, and purifying water that uses human energy from transporting water to purify water according to one aspect of the invention.

FIG. 2A is a detailed view entry container port 900 shown with cap 910 secured to provide a water tight seal and shown with the cap 910 removed to reveal the removable pre-sediment filter 920. Pre-sediment filter 920 or 980 can be removably secured to the entry container port 900 using snaps or any other suitable mechanism to enable the pre-sediment filter 920 to be secured to the container 100 when water is poured through the entry container port 900 but removable for cleaning. The pre-sediment filter 920 or 980 is preferably 0.5 micron or less and is designed to remove debris and larger dirt particles, sediment or silt that may be in unclean water to be put in to the container. After unclean water is poured into container 100 through sediment filter 920, sediment filter 920 can be removed and cleaned.

Figure 2B:
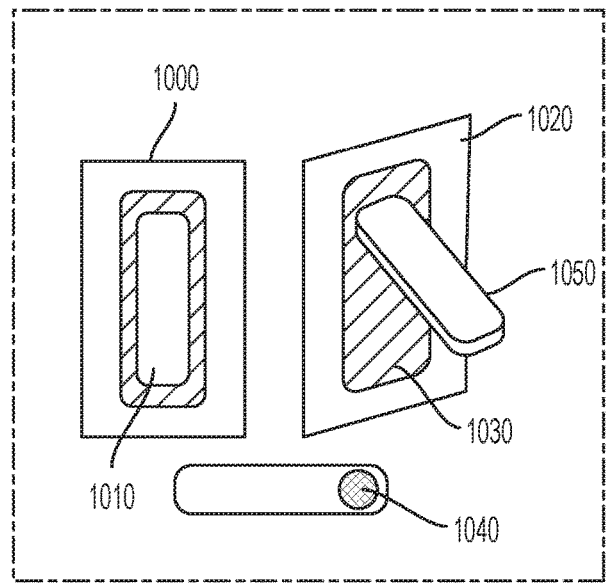

FIG. 2B depicts exit container port 1000 with cap 1010 closed to create a water tight seal. When opened, cap 1020 can form spigot or spout 1050 to facilitate pouring and has a removable post-sediment filter 1030 of 0.3 micron or less to remove any remaining debris ore particles that could be present in the water in the container after it has been purified. The pre-sediment filter 1030 can be removably secured to the exit container port 1000 using snaps or any other suitable mechanism to enable the post-sediment filter 1030 to be secured to the exit container port 1050 when water is poured out, but removable after water is poured out for cleaning.

Although FIGS. 1, 2A and 2B depict separate entry and exit container ports, but one port can be used to serve both functions, using the same or different size filters. The filters are depicted on the external surface 200 of the container 100, but could also be located elsewhere on the container 100, including the container closed ends 400 or 500, so long as there is sufficient space to accommodate them.

Figure 7:
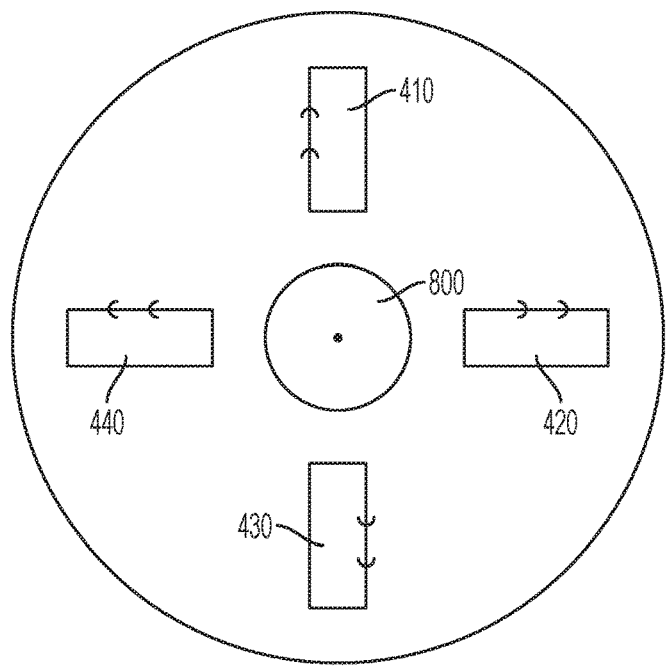
FIG. 7 depicts a right side view of the container that shows removable caps for insertion and removal and replacement of carbon fins or carbon fin cartridges and lighting in an apparatus for collecting, transporting, and purifying water that uses human energy from transporting water to purify water and a removable cap to access the the UV lighting system for repairing and replacing the UV lights.
Figure 8:
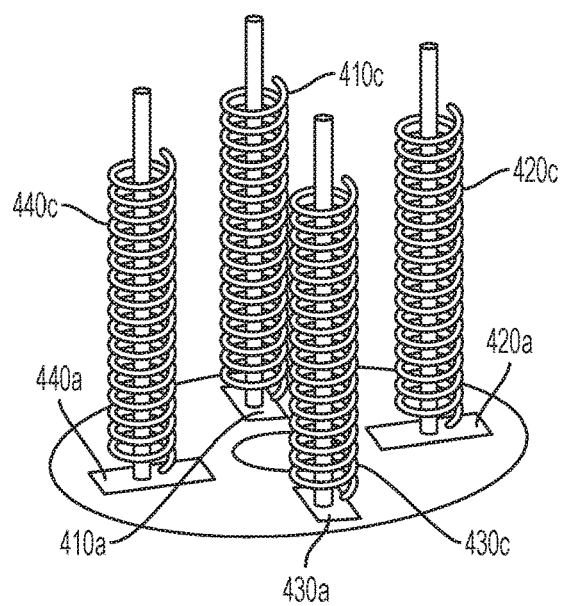
FIG. 8 depicts an example of a spring loaded track mechanism for receiving four carbon fin cartridges.

The container closed end contain gateways 410, 420, 430, 440 with waterproof closures to permit easier access to tracks with spring loaded or friction fit mechanisms or other mechanisms on which corresponding complementary carbon fin cartridges can be releasably secured as described below in connection with FIGS. 3, 7, and 8. FIG. 1 depicts four gateways but container 100 would have three gateways when three fin cartridges are used.

FIG. 3 depicts container 100 in a hollowed internal view to show a removable ultraviolet lighting system 320 and removable carbon fin cartridges 340 and 350 that are employed in the interior of container 100 to purify water when container 100 is used to transport water. The fin cartridges must be removable and replaceable because the effectiveness of the carbon fin cartridges in cleaning water in the container 100 will have a finite life span. Only two carbon fin cartridges are included in FIG. 3. At least three evenly spaced fins or preferably four evenly spaced fin cartridges are used.

Two tube shaped ultra-violet light bulbs 325 and 335 are housed by a translucent, water impermeable, casing 315 meeting in the middle of the inside of the container 100 at a water impermeable electrical box 310 that rotates on the container axis of rotation containing two fixed copper coils 355 and 360, each holding a free falling neodymium magnet 370 and 380. The coils are each wired to their respective light bulbs 325 and 335 through connection to electrical harnesses 330a and 330b that conduct and mediate current and voltage transmission to avoid electrical sparking. The water impermeable casing 315 and electrical box 310 can also be able to be accessed and opened to remove and replace burned out or faulty light bulbs, magnets, and copper coils.

As the container 100 rotates, in accordance with Faraday's law of induction, the fixed copper coils 355 and 360 will alter the magnetic fields of the oscillating neodymium magnets 370 and 380, consequently inducing an electrical current. This electrical current is used to power the UV lights 325 and 335, through connection to electrical harness 330a and 330b ultimately capable of removing 99.99% of present bacteria and microbial contaminants in the water if transported for four hours. Ultimately, the entirety of the electrical purification system draws from the kinetic rotational energy imparted by the rolling vessel. The two UV lights 325 and 335 must be at least 40 Watts each, but may be greater than 40 Watts. Alternatively, a single light of at least 80 Watts could be used. More than one electrical box 310 can be used but each electrical box 310 should reside on the axis of rotation and must be directly connected to the UV lights all housed in the watertight casing 315 as shown in FIG. 3.

As the container 100 rotates, the entire interior electrical apparatus also rotates (fixed to the barrel along the axis of rotation). The only free moving elements are the free falling magnets 370 and 380 which reside within each copper coil 355 and 360. As the container 100 and electrical box 310 rotate, the magnets 370 and 380 repeatedly fall under the influence of gravity causing them to oscillate within the fixed coils 355 and 360. Upon each rotation the magnets 370 and 380 will continue to oscillate inside the coil shafts 355 and 360, altering the magnetic field of the coil, and inducing a voltage.

The voltage that is induced in the coils 355 and 360 is then directly wired into UV lights 325 and 335 through the electrical harnesses 330a and 330b and their connected wiring, with each coil 355 and 360 powering a single UV light 325 and 335. While more than one coil could power a single UV for more power generation, it is preferred to have one coil and magnet powering one UV light. Each UV light is held in an electrical harness 330a and 330b that conducts and mediates current and voltage transmission to avoid electrical sparking.

Figure 5C:
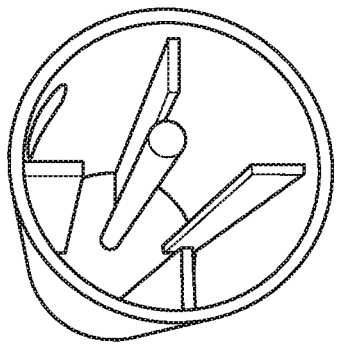
FIGS. 5A, 5B, and 5C depict a side, perspective view of a carbon fin system used with an apparatus for collecting, transporting, and purifying water that uses human energy from transporting water to purify water according to one aspect of the invention.
Figure 5B:
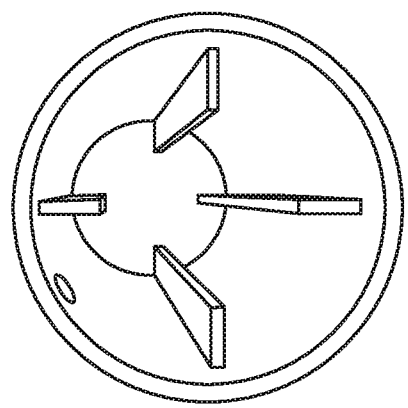
Figure 5A:
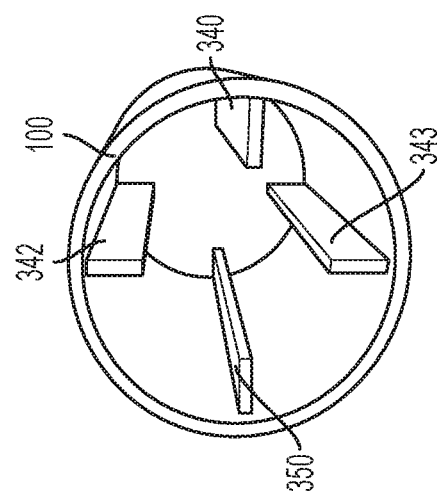
Figure 6A:
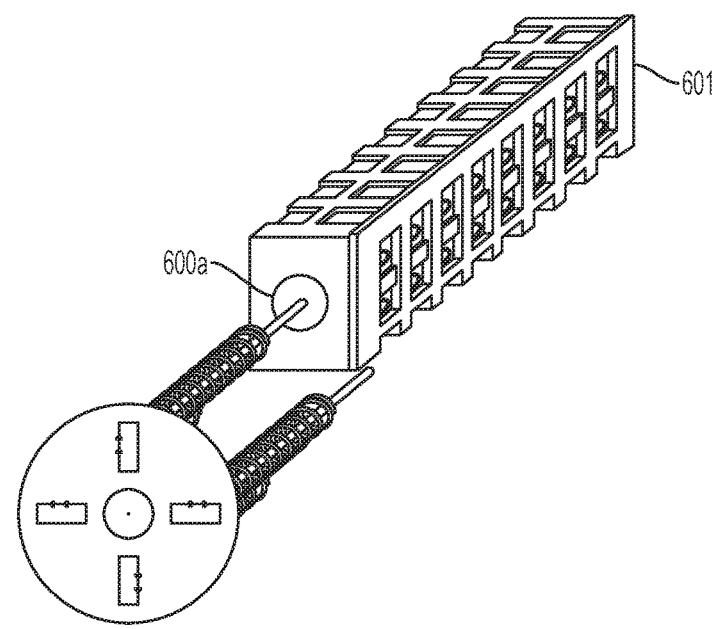
FIGS. 6A and 6B are detailed drawings of a carbon cartridge and track mechanism used with an apparatus for collecting, transporting, and purifying water that uses human energy from transporting water to purify water according to one aspect of the invention.

Also within the vessel, four removable and replaceable activated carbon fin cartridges described in further detail with regard to FIGS. 6A and 6B) are evenly spaced and affixed to track mechanisms on the interior of the vessel described in 6A and 8 below. In FIG. 3, only two fins 340 and 350 are visible. Although use of four fin cartridges is preferred for efficiency in purification, any number of fin cartridges greater than or equal to three would be suitable. Fins, however, must be evenly spaced. FIG. 5A shows a hollowed side view of container 100 with carbon fin cartridges 340, 342, 343, and 350.

The fin cartridges 340, 342, 343, and 350 increase the hydrodynamics of the water, a necessity for purification by means of UV light exposure. In addition, they serve to remove organic chemical contaminants and heavy metals. The carbon in the fin cartridges improves taste, smell, and turbidity of the water.

As the barrel rotates, the entire electrical box 310 also rotates (fixed to the container 100 along the axis of rotation). The only freeform elements in the electrical box 340 the magnets 370 and 380 which resides within each copper coil 350 and 360. As the container 100 and electrical box rotate, the magnet falls under the influence of gravity. Upon each rotation the magnet will continue to oscillate inside the coil shafts, altering the magnetic field of the coil, and inducing a voltage.

The voltage that is induced in the coil is then directly wired into a UV light, with each coil powering a single UV light. While more than one coil could power a single UV light for greater power generation, the current, one coil and magnet powering one UV light is preferred.

Also within the vessel, the four activated carbon fins are evenly spaced and affixed to the interior wall of the container. These fins serve to increase the hydrodynamics of the water, a necessity for purification by means of UV light exposure. In addition, they serve to remove organic chemical contaminants and heavy metals. The carbon is also used to improve taste, smell, and turbidity of the water.

Although it has been established that using four fins is preferred for efficient purification, any number of fins greater than or equal to three would be suitable. Fins, however, must be evenly spaced.

Figure 6B:
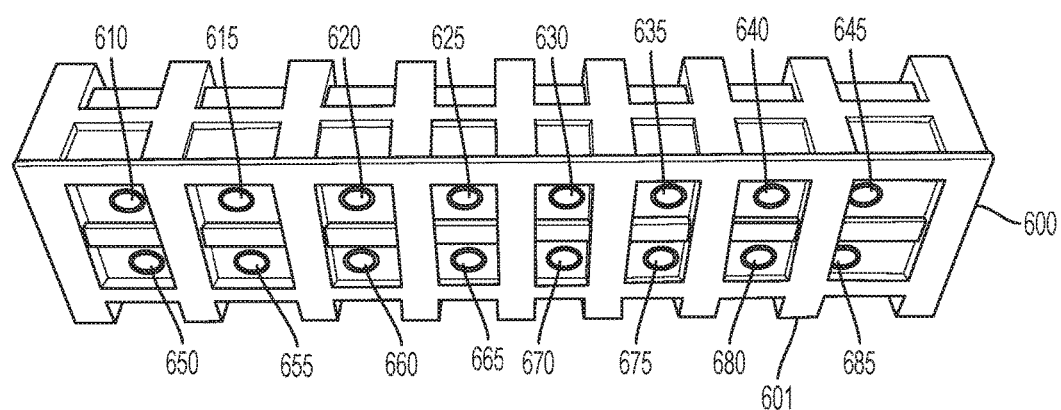

As depicted in FIG. 6B, each fin cartridge can have a polylactic acid shell 600 wrapped in a fine (0.5 micron or less) mesh 601. This shell will be packed with granular activated carbon, allowing it to form a solid panel or cartridge 600. The cartridge 600 has a reinforced socket 600*a* depicted in FIG. 6A that is complementary to receive track mechanisms described in further detail with respect to FIG. 7.

The design of the polylactic acid shell cartridge 600 provides structure sufficient to propel the water according to the Reynold's number (inertial forces outweigh viscous forces in a liquid), while the mesh in the casing also allows the cartridge to be permeable so that the carbon can more effectively purify the water.

Each cartridge is drilled with 1 inch circular holes 610, 615, 620, 625, 630, 635, 640, 645, 650 655, 660, 665, 670, 675, 680, 685, evenly spaced preferably at least 2 inches from one another along the length of the fin. Each drilled hole 610*a*, 615*a*, 620*a*, 625*a*, 630*a*, 635*a*, 640*a*, 645, 650*a*, 655*a*, 660*a*, 665*a*, 670*a*, 675*a*, 680*a*, 685*a* will be covered in mesh (just as the exterior of the cartridge is) to increase surface area exposure of the water to the carbon, optimizing productivity and the kinetic energy generated from transporting the container.

The efficacy of the carbon in the cartridge is preferably optimized with one inch holes, but any diameter of drilled hole will be effective as long as it is less than 3 inches. The system, in its entirety, serves to lessen the burden of water collection and transportation, while also simultaneously comprehensively purifying the collected water. The container allows for water to be potable for consumption immediately upon return from collection.

Because activated carbon has a projected lifespan of 18 months, the fins are removable. A spring loaded base and track mechanism is depicted in FIGS. 6A and 8 for receiving fin cartridges 600 at a reinforced complementary socket 600*a*. The container 100 contains gateways 410, 420, 430, and 440 where carbon cartridges can be removed and inserted. The openings for the gateways 410, 420, 430, and 440 with caps or other closure mechanisms to seal in water will correspond to and mimic the position of the carbon fins and have track mechanisms 410*c*, 420*c*, 430*c*, and 440*c* fixed to bases 410*a*, 420*a*, 430*a*, 440*a* affixed to the interior of container closed end 500 the container 100, corresponding to each of the gateways 410, 420, 430, 440 and track mechanisms 410*c*, 420*c*, 430*c*, and 440*c* to receive corresponding fin cartridges. FIGS. 6A and 8 depict spring loaded track mechanisms for releasably fixing the fin cartridges, but the track mechanisms also could be releasably friction fit to the reinforced complementary socket 600*a*.

The invention has been described in terms of particular embodiments. The alternatives described herein are examples for illustration only and not to limit the alternatives in any way.

Certain steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. An apparatus for storing, transporting and cleaning water comprising:
   a rounded barrel shaped, water impermeable container made of material comprising an ultraviolet light stabilized polymer,
   the container comprising an interior container surface and exterior container surface,
   two opposing container closed ends, the container closed ends each having an internal surface and external surface,
   at least one container port and corresponding removable container port cap,
   a handle connected to two removable arms rotatably attached to the container at a container axis of rotation to at least one of the two opposing container closed ends;
   the container further comprising a removable translucent, water impermeable casing attached to the inner surface of the container closed ends at the container axis of rotation that can be opened,
   an electrical box that can be opened, and the casing comprising at least two removable and replaceable tube shaped ultraviolet lights and at least two fixed copper coils inside the casing,
   a free falling magnet that oscillates inside each of the at least two fixed copper coils when the container is rotated,
   the ultraviolet lights and the at least two copper coils connected to at least one electrical harness inside the casing;
   the container further comprising at least three activated carbon fin cartridges releasably fixed to a corresponding fin base and track, the fin base and track fixed to the inner surface of the container closed ends, the fins spaced proportionally around a circumference of the inner surface of the container.

2. The apparatus of claim 1, the exterior container surface further comprising a tractive surface material.

3. The apparatus of claim 2, wherein the at least one container port is recessed in the container comprises a removable container port sediment filter and the container port is configured to create a water tight seal in the container when the removable container port cap is removably fixed to the container port substantially flush to the container surface to permit the container to roll.

4. The apparatus of claim 3, wherein the at least one removable container port sediment port filter is configured to be rotatable about a filter port axis to pour water in or out from the container.

5. The apparatus of claim 4, wherein the at least one container port comprises an entry container port and an exit container port, the entry container port for pouring untreated water into the container comprising a removable entry port pre-sediment filter of 0.5 micron or less and the exit container port for pouring purified water from the container comprising a pre-sediment filter of 0.3 micron or less for removing finer particles or silt and a flip to open dispensary nozzle.

6. The apparatus of claim 4, wherein the ultraviolet lights, the copper coils, and the electrical harness are configured to generate power to light the ultraviolet lights when the container is rotated about the container axis of rotation.

7. The apparatus of claim 6, wherein the at least two ultraviolet lights are at least 40 watts each.

8. The apparatus of claim 6, comprising four activated carbon fin cartridges releasably fixed to corresponding fixed fin bases and tracks.

9. The apparatus of claim 6, wherein one of the container closed ends contain gateways comprising caps or closures corresponding to the fin bases and tracks to permit removal of the carbon activated fin cartridges from the corresponding fin base and tracks, wherein the corresponding fin bases and tracks use spring loaded mechanisms to releasably fix the fin cartridges.

10. The apparatus of claim 6, wherein one of the container closed ends contain gateways comprising caps or closures corresponding to the fin bases and tracks to permit removal of the activated carbon fin cartridges from the corresponding fin base and tracks, wherein the corresponding fin bases and tracks are fastened together by a friction fit to releasably fix the fin cartridges to the fin tracks.

11. The apparatus of claim 6, wherein the at least three activated carbon fin cartridges further comprise a polylactic acid shell wrapped in liquid permeable mesh of 0.5 micron or finer that forms a cartridge, and one of the container closed ends further comprises gateways with removable caps corresponding to the fin bases and tracks.

12. The apparatus of claim 10, wherein outer walls of the cartridges further comprise evenly spaced circular holes covered by the liquid permeable mesh.

13. The apparatus of claim 10, wherein a height of the cartridges as measured along a radius of the container is less than 2 inches fewer than a radius of the container and a depth of the cartridges as measured in a direction perpendicular to the radius of the container and perpendicular to the container axis of rotation is greater than 0.5 inches but does not exceed 3 inches and a length of the cartridges as measured along the container axis of rotation is approximately equal to a length of the container.

14. The apparatus of claim 12, wherein the evenly spaced circular holes are 1 inch or less in diameter and spaced at least 2 inches apart.

15. The apparatus of claim 11, wherein the container is made of low-density polyethylene UV stabilized by hindered amine light stabilizers.

16. The apparatus of claim 11, wherein the handle is made from electroplated steel and further comprises a coating with heat capacity to prevent burning when held.

17. A method of transporting and purifying water comprising:
providing a rounded barrel shaped, water impermeable container made of material comprising an ultraviolet light stabilized polymer, the container comprising an interior container surface and exterior container surface, wherein the exterior container surface comprises a tractive material, two opposing container closed ends, the container closed ends each having an internal surface and external surface, wherein the external surface, at least one container port and corresponding recessed container port cap, a handle and two removable arms rotatably attached to the container at a container axis of rotation to at least one of the two opposing container closed ends, the container further comprising a translucent, accessible, removable water impermeable casing attached to the inner surface of the container closed ends at the container axis of rotation, the casing comprising at least two removable tube shaped ultraviolet lights and least two fixed copper coils inside the casing, a free falling magnet inside each of the at least two fixed copper coils, the at least two ultraviolet lights and the at least two copper coils connected to at least one electrical harness inside the casing the container further comprising at least three activated carbon fin cartridges releasably fixed to a corresponding fin base and track, the fin base and track fixed to the inner surface of at least one of the container closed ends, the fin cartridges spaced proportionally around a circumference of the inner surface of the container;
inserting into the at least one container port a removable pre-sediment filter of 0.5 micron or less to remove particles or silt from the water;
pouring water to be transported and purified into the container through the pre-sediment filter; sealing the at least one container port with the removable container port cap so that the container can roll about the container axis of rotation; transporting the container filled with water by pushing or pulling the container by the handle to roll the container; the free falling magnets oscillating inside the at least two copper coils to induce voltage sufficient to light the ultraviolet lights on the water in the container to purify the water; propelling the water in the container through the at least three carbon fin cartridges to purify the water.

18. The method of transporting and purifying water of claim 17, further comprising:
inserting into one of the at least one container ports a removable pre-sediment filter of 0.3 micron or less;
removing purified water from the container through the removable pre-sediment filter of 0.3 micron or less to remove any remaining dirt or silt from the purified water.

19. The method of transporting and purifying water of claim 17, wherein there are four removable activated carbon fin cartridges.

20. The method of transporting and purifying water of claim 17, wherein the removable activated carbon fin cartridges further comprise a polylactic shell wrapped in liquid permeable mesh of 0.5 micron or finer that forms a cartridge.

21. The method of transporting and purifying water of claim 19, wherein the transporting step is performed for one to four hours.

22. The method of transporting and purifying water of claim 19, wherein the carbon fin cartridges further comprise evenly spaced circular holes covered by liquid permeable mesh.

23. The method of transporting and purifying water of claim 22, wherein a height of the cartridges as measured along a radius of the container is less than 2 inches fewer than a radius of the container and a depth of the cartridges as measured in a direction perpendicular to the radius of the container and perpendicular to the axis of rotation of the container is greater than 0.5 inch but does not exceed 3 inches and a length of the cartridges as measured along the axis of rotation of the container is approximately equal to a length of the container.

24. The method of transporting and purifying water of claim 23, wherein the container is made of low-density polyethylene UVB stabilized by hindered amine light stabilizers.

25. The method of transporting and purifying water of claim 23, further comprising an exit container port for pouring purified water from the container comprising a post-sediment filter of 0.3 micron or less for removing finer particles or silt and a flip to open dispensary nozzle for consumption.

* * * * *